(12) United States Patent
Rosas et al.

(10) Patent No.: US 8,417,719 B1
(45) Date of Patent: Apr. 9, 2013

(54) METHOD AND SYSTEM TO DERIVE SALUTATIONS

(75) Inventors: Patricia Rosas, San Antonio, TX (US); Daniel P. Black, Converse, TX (US); Larry W. Clark, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 271 days.

(21) Appl. No.: 11/550,756

(22) Filed: Oct. 18, 2006

(51) Int. Cl.
*G06F 17/30* (2006.01)
(52) U.S. Cl. .................................... 707/769
(58) Field of Classification Search .............. 707/100, 707/1, 708, 769
See application file for complete search history.

(56) References Cited

U.S. PATENT DOCUMENTS

| | | | |
|---|---|---|---|
| 4,625,081 A | 11/1986 | Lotito et al. | |
| 4,965,763 A | 10/1990 | Zamora | |
| 5,434,908 A * | 7/1995 | Klein | 379/88.23 |
| 5,628,004 A | 5/1997 | Gormley et al. | |
| 5,806,057 A * | 9/1998 | Gormley et al. | 707/1 |
| 5,819,263 A | 10/1998 | Bromley et al. | |
| 2001/0051962 A1* | 12/2001 | Plotkin | 707/522 |
| 2002/0016720 A1* | 2/2002 | Poropatich et al. | 705/3 |
| 2002/0095357 A1* | 7/2002 | Hunter et al. | 705/27 |
| 2004/0094478 A1* | 5/2004 | Nobel | 210/634 |
| 2004/0123101 A1 | 6/2004 | Rineer et al. | |

OTHER PUBLICATIONS

Merriam-Webster's collegiate dictionary. 1997, Library of Congress, 10th editio, "Forms of Address" pp. 1551-1557.*
http://search.yahoo.com/>, partial search results for phrase "fixing letter salutations",(Aug. 21, 2006),2 p.
http://search.yahoo.com/>, partial search results for phrase "fixing salutations",(Aug. 21, 2006),2 p.
http://search.yahoo.com/>, partial search results for phrase "letter salutation software",(Aug. 21, 2006),2 p.
http://search.yahoo.com/>, partial search results for phrase "salutation software",(Aug. 21, 2006),2 p.
http://search.yahoo.com/>, partial search results for phrase "salutation utility",(Aug. 21, 2006),2 p.
http://search.yahoo.com/>, partial search results for phrase "salutation software utility",(Aug. 21, 2006),6 p.
http://search.yahoo.com/>, partial search results for phrase "salutation software",(Aug. 21, 2006),6 p.

(Continued)

*Primary Examiner* — Amresh Singh
(74) *Attorney, Agent, or Firm* — Brooks, Cameron & Huebsch, PLLC

(57) ABSTRACT

A method, apparatus and system to derive salutations. User information for a user is accessed. A title salutation is selectively generated for the user when the user has a title identified within the user information and the use of the title has not been overridden, and another salutation has not been generated for the user. A military salutation is selectively generated for the user when the user has a military rank and a military title identified within the user information, the user is not separated from a military organization, a rank of the user has not been suppressed, and another salutation has not been generated for the user. A gender salutation is generated for the user when another salutation has not been generated for the user and the user information is in an acceptable format.

20 Claims, 17 Drawing Sheets

OTHER PUBLICATIONS

"Letter Writing in Fundraising Software", http://www.fundraisersoftware.com/products/donormgtletter.html, (2006), 2 p.

"matchIT Features", http://helpit.com/folders/software_features/matchit_features, (2006), 2 p.

"Membership System", http://www.accessunlimited.co.uk/products2.html, (Aug. 27, 2006), 4 p.

"Summary of Capabilities: Oak!Check!", http://www.oakpro.com/prod02_features.htm, (Oct. 15, 2006), 3 p.

* cited by examiner

METHOD AND SYSTEM TO DERIVE SALUTATIONS

RELATED APPLICATIONS

This disclosure is related to pending U.S. patent application Ser. No. 11/550,764, titled "METHOD AND SYSTEM TO DERIVE SALUTATIONS," and U.S. patent application Ser. No. 11/550,777, titled "METHOD AND SYSTEM TO DERIVE SALUTATIONS," filed on an even date herewith.

TECHNICAL FIELD

This application relates to a method and system to derive salutations and more particularly to an automated system for generating salutations for use by applications.

BACKGROUND

Salutations are used on communications (e.g., letters and/or envelopes) to identify a recipient of the communication. Salutations used in business letter writing typically identify the recipient appropriately based on a title, gender, and/or military rank of the recipient. Some applications may generate the salutations for the communications based on accessed user information.

Applications that access stored information for a plurality of users typically generate salutations for the plurality of users by deriving the salutations within each application. Since an entity may have multiple applications that each generate salutations, changes to a method for generating the salutations in a first application may not be reflected in the method for generating the salutations in a second application, thereby causing the applications from a same entity to generate different salutations to the same user.

SUMMARY

In an example embodiment, a system for driving salutations is described. The system includes user data for a plurality of users, a salutation application to derive salutations for users of the plurality of users from the user data; and a use application configured to respectively request a salutation for a user from the salutation application and to receive a derived salutation.

In an example embodiment, a method of deriving salutations is described. The method includes accessing user information for a user, selectively generating a title salutation for the user when the user has a title identified within the user information and the use of the title has not been overridden and another salutation has not been generated for the user, selectively generating a military salutation for the user when the user has a military rank and a military title identified within the user information, the user is not separated from a military organization, a rank of the user has not been suppressed, and another salutation has not been generated for the user; and generating a gender salutation for the user when another salutation has not been generated for the user and the user information is in an acceptable format.

In an example embodiment, a method of deriving salutations is described. The method includes accessing user information for a user, selectively generating a business salutation for the user when the user information identifies the user as a business and another salutation has not been generated for the user, parsing the user information for a user, selectively generating a title salutation for the user when the user has a title identified within the user information and the use of the title has not been overridden and another salutation has not been generated for the user, and generating a gender salutation for the user when another salutation has not been generated for the user and the user information is in an acceptable format.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this invention.

Figure 1:
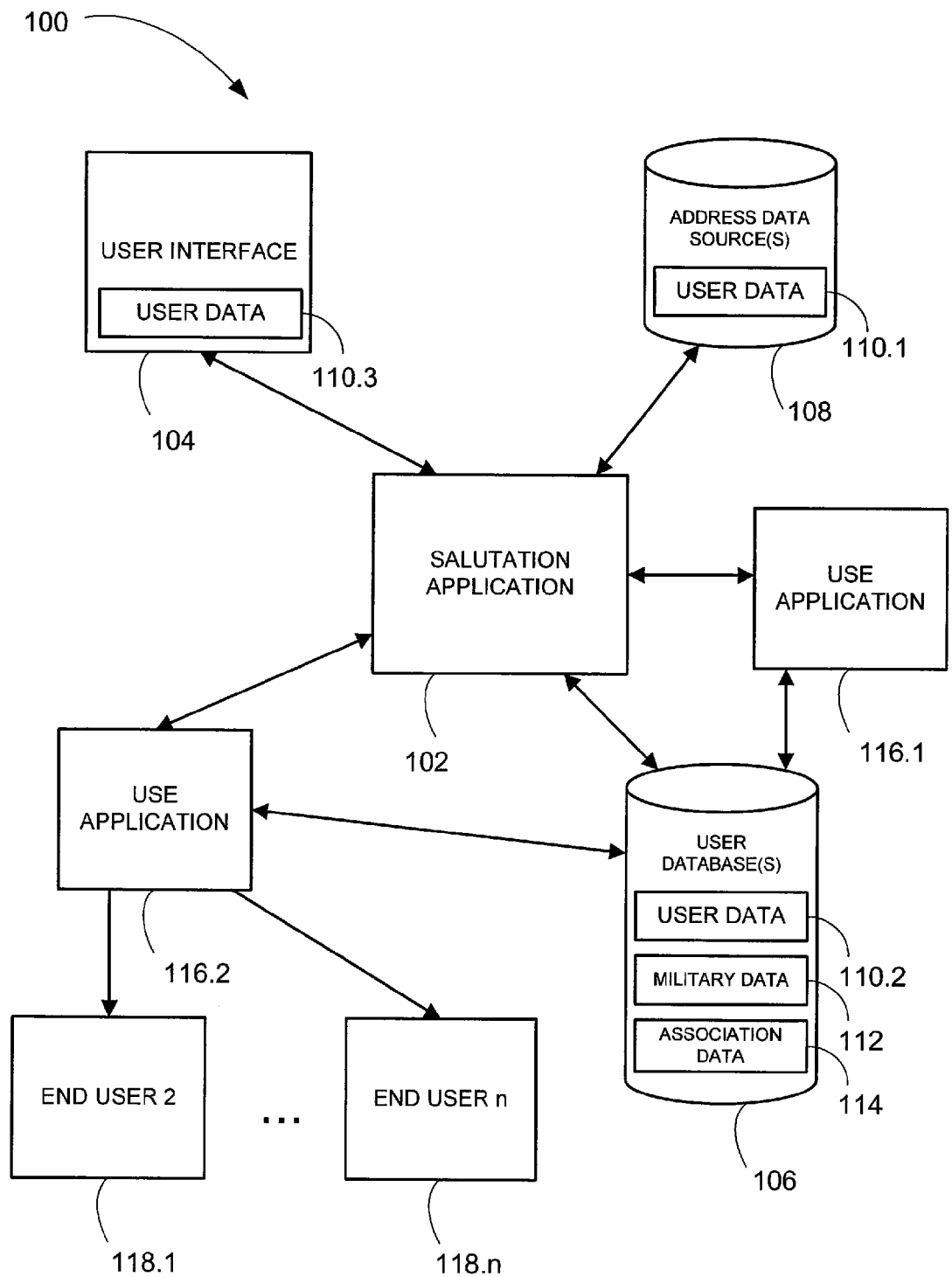
FIG. 1 is a block diagram of a system to derive salutations for one or more applications in accordance with an example embodiment.

Referring to FIG. 1, a system 100 to derive salutations for one or more applications in accordance with an example embodiment is illustrated. The system 100 is shown to include a salutation application 102 that may access user data 110 for deriving salutations from a user interface 104, one or more user databases 106, and one or more address data sources 108. User information regarding a plurality of the users may be provided through the user interface 104 and/or obtained from user data 110.1-110.3, military data 112, and/or association data 114 from within the user database 106, the address data source 108 and/or the user interface 104. An example embodiment of the user interface 104 is described in greater detail below. Example methods of deriving salutations with the salutation application 102 are described in greater detail below.

In an example embodiment, a salutation may be a phrase (e.g., one or more words) of a greeting (e.g., as Gentlemen or Dear Sir or Madam) that may come immediately before a body of a letter.

The salutation application 102 may use the user information received to derive salutations for the users and return derived salutations through the user interface 104 and/or to one or more use applications 116.1, 116.2. The use applications 116.1, 116.2 may retain the salutations for their use and/or may provide the salutations (and optional accompanying user information to respectively identify a plurality of users with a plurality of salutations) to one or more end users 118.1-118.n that may incorporate the salutations into correspondence and/or greetings to be provided to a plurality of users.

In an example embodiment, the use applications 116.1, 116.2 may be applications that desire salutations for its users. In an example embodiment, the use applications 116.1, 116.2 may include web servers, word processing programs, mailing (e.g., physical and/or electronic) programs, card printing programs, banking programs, and the like. In an example embodiment, the use applications 116.1, 116.n may communicate with the user database 106, such as to perform non-salutation applications.

In an example embodiment, the end users 118.1-118.n may include mail houses, third-party printing services, third party websites, third party vendors, and the like.

Figure 2:
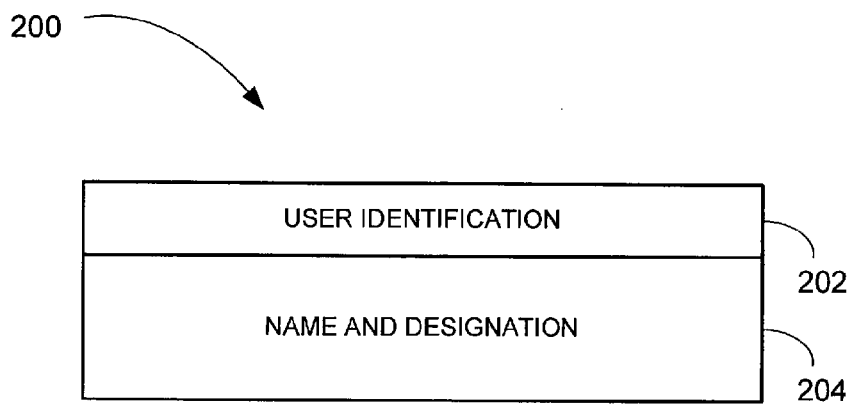
FIG. 2 is a block diagram of a user data structure according to an example embodiment.

Referring to FIG. 2, a user data structure 200 in accordance with an example embodiment is illustrated. In an example embodiment, the user data 110 (see FIG. 1) may include a plurality of user data structures 200. In an example embodiment, the user data structure 200 may retain user information of a user.

The user data structure 200 may include an optional user identification field 202 and a name and designation field 204. For example, the name and designation field 204 may provide personal information regarding a user. An example embodiment of the name and designation field 204 is illustrated in greater detail below.

The user identification field 202 may be used to identify a user. For example, a unique identification (e.g., a user number) within the user identification field 202 may enable a user to be identified among the plurality of users from within the user database 106 and/or address data source 108 (see FIG. 1). In an example embodiment, the identification field 202 may include the user number and an identifier indicating whether the user is an individual or a business.

Figure 3:
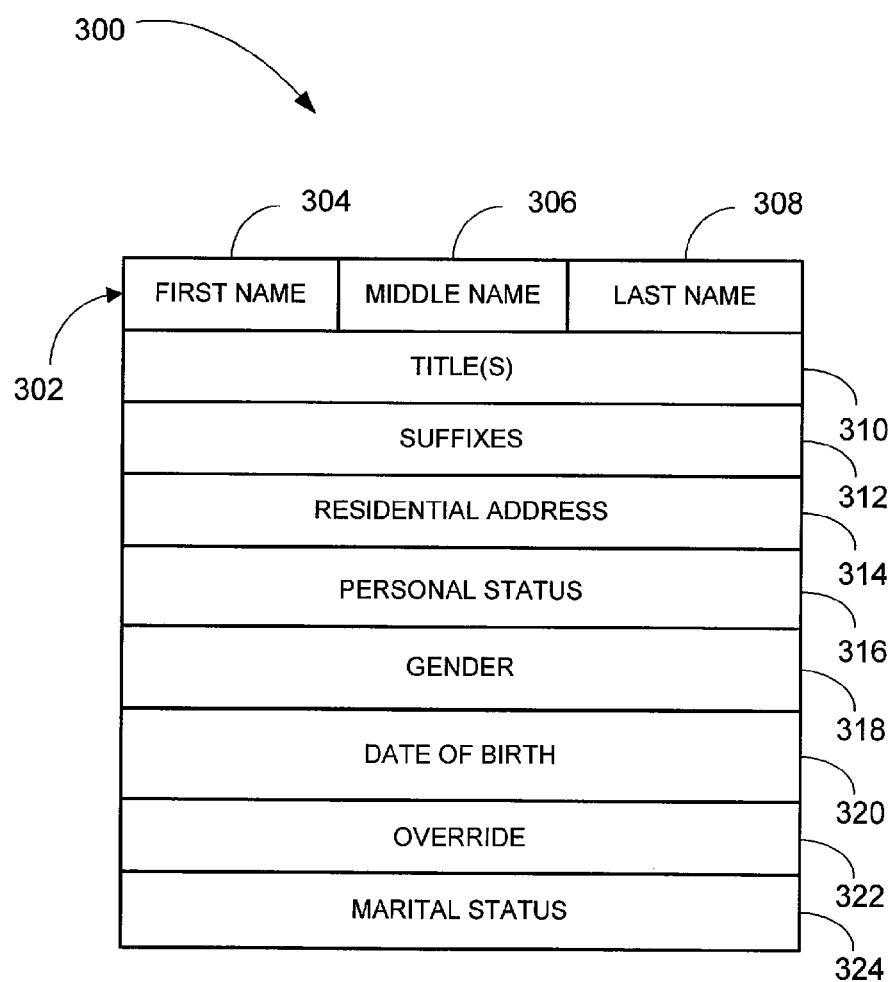
FIG. 3 is a block diagram of a name and designation data structure according to an example embodiment.

Referring to FIG. 3, a name and designation data structure 300 in accordance with an example embodiment is illustrated. In an example embodiment, the name and designation field 204 (see FIG. 2) may include the name and designation data structure 300. In an example embodiment, the user data 110 (see FIG. 1) may include a plurality of the name and designation data structures 300. In an example embodiment, the name and designation data structure 300 may retain user information of a user.

The name and designation data structure 300 may include a name field 302 including a first name field 304, middle name field 306, and a last name field 308 to respectively retained a first name, a middle name, and a last name of a user. One or more titles (e.g., professional designations) of the user may be retained in a title field 310, and one or more suffixes of the user may be retained in suffix field 312.

An optional residential address field 314 may be used to retain a residential address of a user. As described below, the residential address field 314 may be used in some embodiments to process a family salutation and/or check a child status of a user.

A personal status field 316 of the name and designation data structure 300 may indicate whether a user is living or deceased, while a gender field 318 may indicate the gender (e.g., male or female) of the user. A date of birth field 320 may retain a date of birth of the user and/or age of the user.

An override field 322 may indicate whether a particular type of salutation should be used and/or overridden (e.g., not be used). In an example embodiment, an indicator in the override field 322 may indicate not to use a title of the title field for creating a salutation. In an example embodiment, an indicator in the override field 322 may indicate to suppress rank (e.g., not to create a military salutation for the user).

A marital status field 324 may indicate whether the user is married. For example, the marital status field may have values including single, married, divorced, separated, widowed, and the like.

Figure 4:
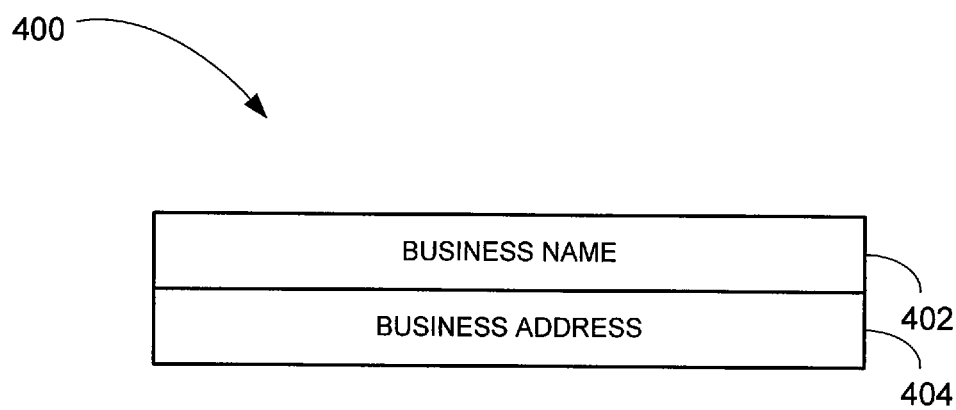
FIG. 4 is a block diagram of a name and designation data structure according to an example embodiment.

Referring to FIG. 4, a name and designation data structure 400 in accordance with an example embodiment is illustrated. In an example embodiment, the name and designation field 204 (see FIG. 2) may include the name and designation data structure 400. In an example embodiment, the user data 110 (see FIG. 1) may include a plurality of the name and designation data structures 400. In an example embodiment, the name and designation data structure 400 may retain user information of a user.

The name and designation data structure 400 may include a business name field 402 and a business address field 404. The business name field 402 may identify a name of a business, while the business address field 404 may provide an address for the business.

Figure 5:
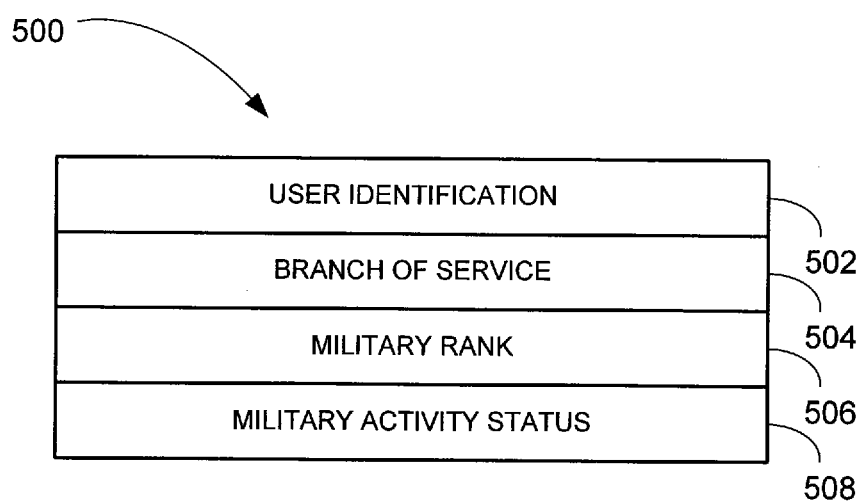
FIG. 5 is a block diagram of a military service data structure according to an example embodiment.

Referring to FIG. 5, a military service data structure 500 in accordance with an example embodiment is illustrated. In an example embodiment, the military data 112 (see FIG. 1) may include a plurality of military service data structures 500. For example, the military service data structure 500 may retain user information of a user.

The military service data structure 500 may include a user identification field 502, a branch of service field 504, a military rank field 506, and a military activity status field 508.

The user identification field 502 may be used to identify a user. For example, a unique identification (e.g., a user number) within the user identification field 502 may enable a user to be identified among the plurality of users from within the military data 112 (see FIG. 1).

In an example embodiment, the user identification field 502 may be used to match the military service data structure 500 of a user to the user data structure 200 of a same user through the user identification field 202 (see FIG. 2). For example, the user identification fields 202, 502 may be matched through use of a same identifier, however other field matching such as through the use of pointers may also be used.

The branch of service field 504 may identify a branch of service in which a user has served or is currently serving. For example, the branches of services identified in the branch of service field 504 may include army, navy, marine corps, national guard, and coast guard.

The military rank field 506 may identify a current rank of the user. For example, the current rank of the user in the military rank field 506 may include second lieutenant, first lieutenant, captain, major, lieutenant colonel, colonel, brigadier general, major general, lieutenant general, general such as for the military branches of the army, air force, and/or marines, and ensign, lieutenant junior grade, lieutenant, lieutenant commander, commander, captain, rear admiral, vice admiral, and admiral for the military branches of the navy and/or coast guard. In an example embodiment, the current rank may be stored as a numeric value, an identity of which may be looked up in a table.

The military activity status field 508 may identify the military status of the user. For example, the military status of the user may include active, retired, precommissioned, active reserved, retired, inactive reserve, none and separated.

Figure 6:
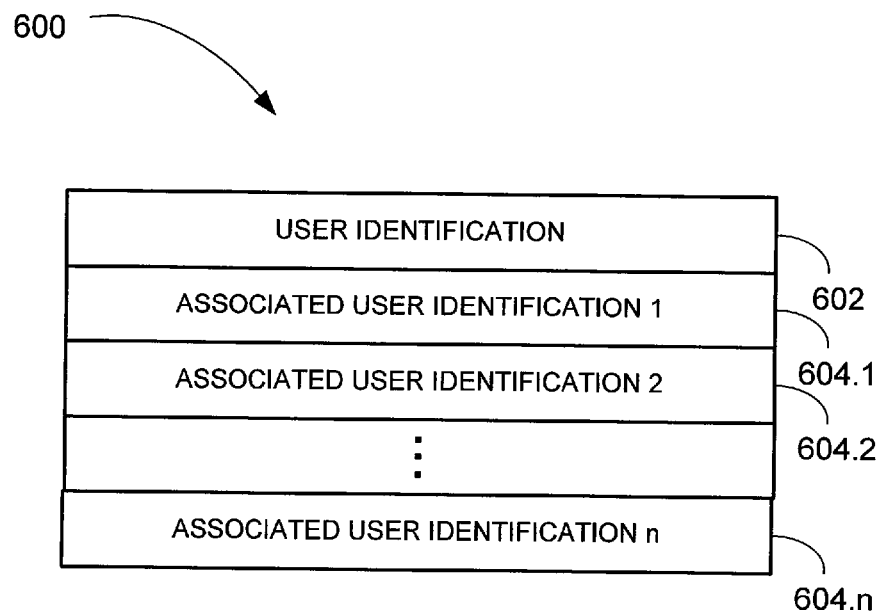
FIG. 6 is a block diagram of an associated user data structure according to an example embodiment.

Referring to FIG. 6, an association data structure 600 in accordance with an example embodiment is illustrated. The association data structure 600 may associate a first user with one or more additional users by use of the user identification fields 202, 502 (see FIGS. 2 and 5) to show relationships such as husband/wife, parent/child, brother/sister, and the like. In an example embodiment, the association data 114 (see FIG. 1) may include a plurality of association data structures 600.

The association data structure 600 may include a user identification field 502 to identify a user. For example, a unique identification (e.g., a user number) within the user identification field 602 may enable a user to be identified among the plurality of users from within the user data 110, the military data 112, and/or the association data 114 (see FIG. 1).

In an example embodiment, the user identification field 602 may be used to match the association data structure 500 of a user to the user data structure 200 of a same user through the user identification field 202 (see FIG. 2). For example, the user identification fields 202, 602 may be matched through use of a same identifier, however other field matching such as through the use of pointers may also be used.

Remaining fields of the user identification field 602 may include associated user identification fields 604.1-604.*n*, which may include user identifications for a number of other users of the user data 110. For example, the associated users fields 604.1-604.*n* may identify members of a same family and the relationship of the associated users with the user identified by the user identification field 602.

Figure 7:
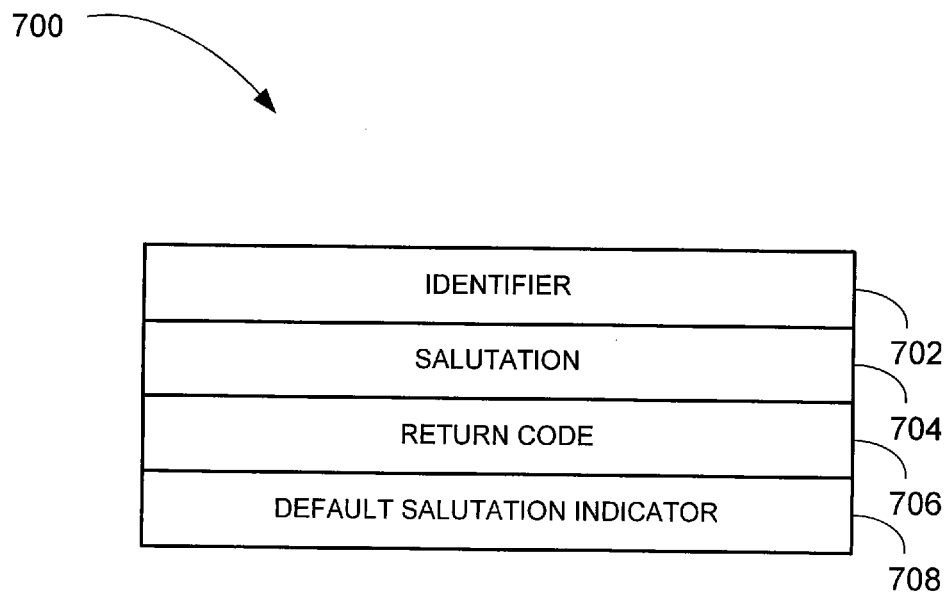
FIG. 7 is a block diagram of an output data structure according to an example embodiment.

Referring to FIG. 7, an output data structure 700 in accordance with an example embodiment is illustrated. The output data structure 700 may include an identifier field 702, a salutation field 704, an optional return code field 706, and an optional default salutation indicator field 708. In an example embodiment, the output data structure 700 may be a format of which a salutation is outputted from the salutation application 102 (see FIG. 1).

The identifier field 702 may identify a user for whom a salutation has been generated. For example, the identifier field 702 may include the user identification field 202, 502, 602, and/or the name field 302 and/or the business name field 402 (see FIGS. 2-6). The salutation field 704 may identify a generated salutation for the user identified in the identifier field 702.

The return code field 706 and the default salutation indicator field 708 may provide feedback to a person running and/or administering the salutation application 102 as to whether results of the salutation application 102 were as expected. For example, the return code field 706 may provide codes indicating errors in the processing of user information by the salutation application 102, such as branch of service not found, an individual's sex is invalid, the marital status is invalid, and the like. The default salutation indicator field 708 may indicate whether a default salutation was generated for a user.

Figure 8:
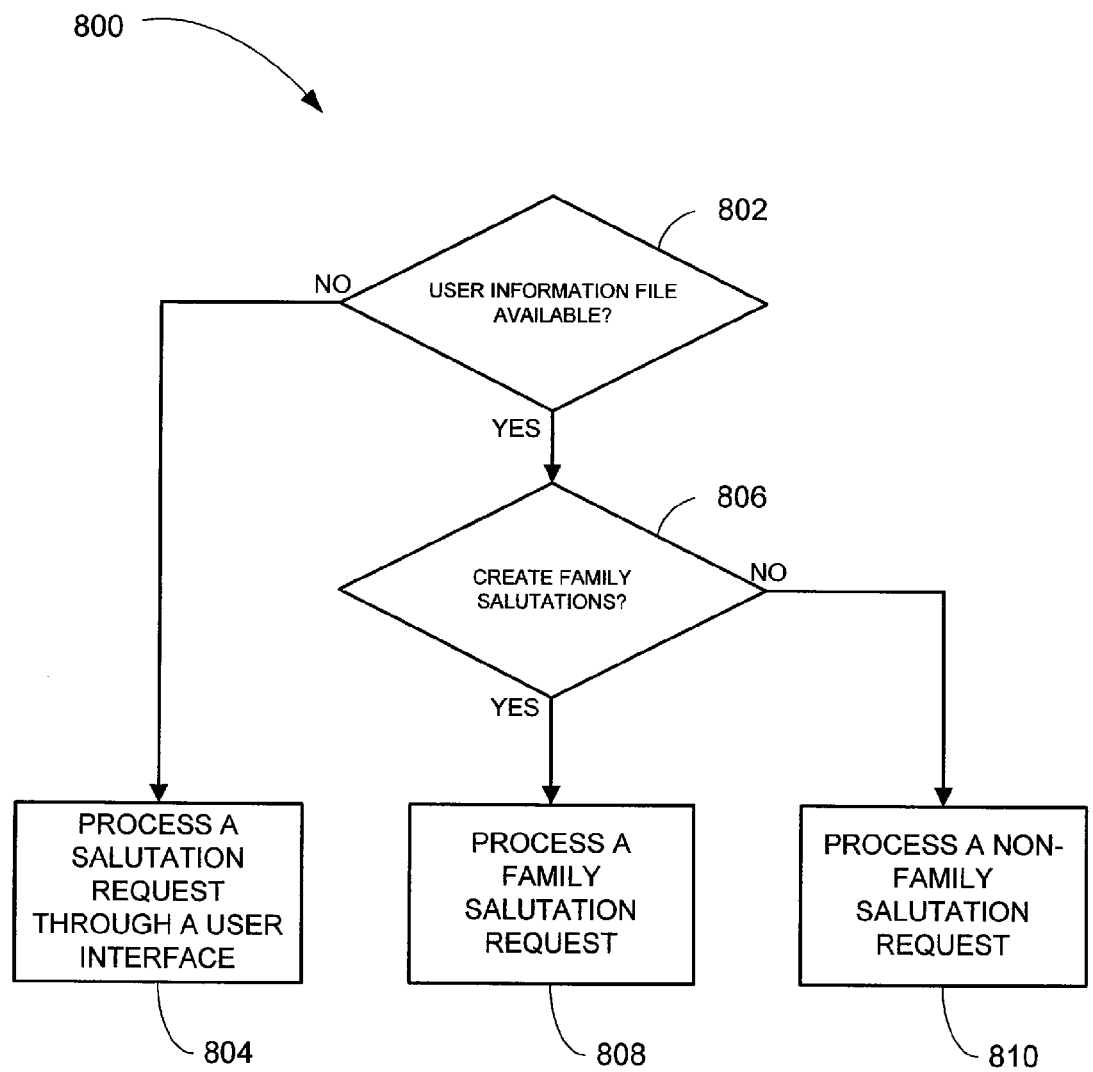
FIG. 8 is a flowchart illustrating a method in accordance with an example embodiment for selecting a salutation generation process.

Referring to FIG. 8, a method 800 for selecting a salutation generation process in accordance with an example embodiment is illustrated. In an example embodiment, the operations of method 800 may be performed by the salutation application 102 (see FIG. 1).

At decision block 802, a determination may be made as to whether a user information file is available for processing one or more salutations. For example, the user information file may be a file and/or other data listing providing user information of users from whom generation of a salutation is desired. If the user information file is not available, a salutation request may be processed through the user interface 104 (see FIG. 1) at block 804. An example embodiment of processing the salutation request through the user interface 104 is described in greater detail below.

If the user information file is not available at decision block 802, the method 800 may determine whether one or more family salutations should be created at block 808. For example, the family salutation may be a salutation to a family while a non-family salutation may be to an individual and/or a representative of an individual. If family salutations should be created, a family salutation request may be processed at block 808. An example embodiment of processing the family salutation request is described in greater detail below.

If family salutations should not be created at decision block 806, the non-family salutation request (e.g., a request for a salutation to an individual and/or a representative of an individual) may be processed at block 810. An example embodiment of processing the non-family salutation request is described in greater detail below. After completion of the operations at block 804, block 808, or block 810, the method 800 may terminate.

Figure 9:
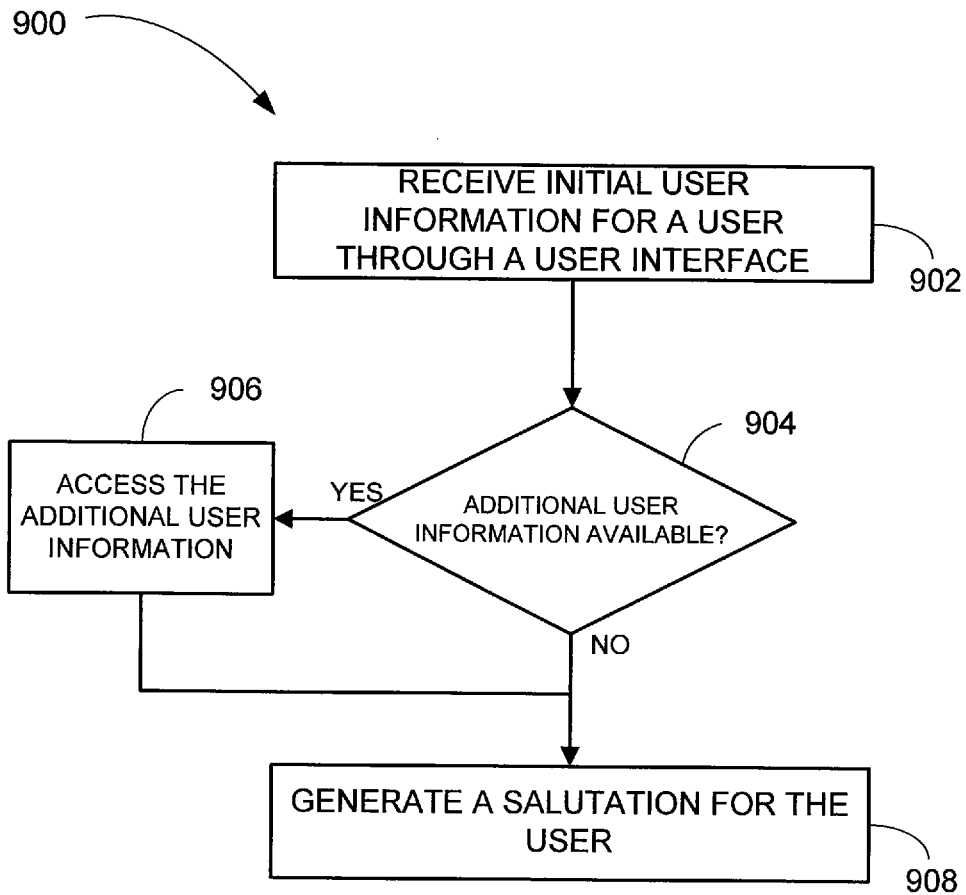
FIG. 9 is a flowchart illustrating a method in accordance with an example embodiment for processing a salutation request through a user interface.

Referring to FIG. 9, a method 900 for processing a salutation request through the user interface 104 (see FIG. 1) in accordance with an example embodiment is illustrated. In an example embodiment, the operations of the method 900 may be performed at block 804 (see FIG. 8).

Initial user information may be received for a user through the user interface 104 at block 902. For example, the initial user information of the user may include a user name, a user identification, and/or other information from the fields of the user data structure 200, the name and designation data structures 300, 400, the military service data structure 500, and/or the association data structure 600.

At decision block 904, a determination may be made as to whether additional user information is accessible for the user from one or more fields of the user data 110, the military data 112, and/or the association data 114 (see FIG. 1). If the additional user information is accessible, the additional information may be accessed from the user data 110, the military data 112, and/or the association data 114 for the user at block 906. If the additional user information is not available for the user at decision block 904 or after block 906, a salutation may be generated for the user with user information (e.g., the initial user information and/or the additional user information) at block 908. An example embodiment for generating the salutation for a user is described in greater detail below. After completion of the operations at block 908, the method 900 may terminate.

Figure 10:
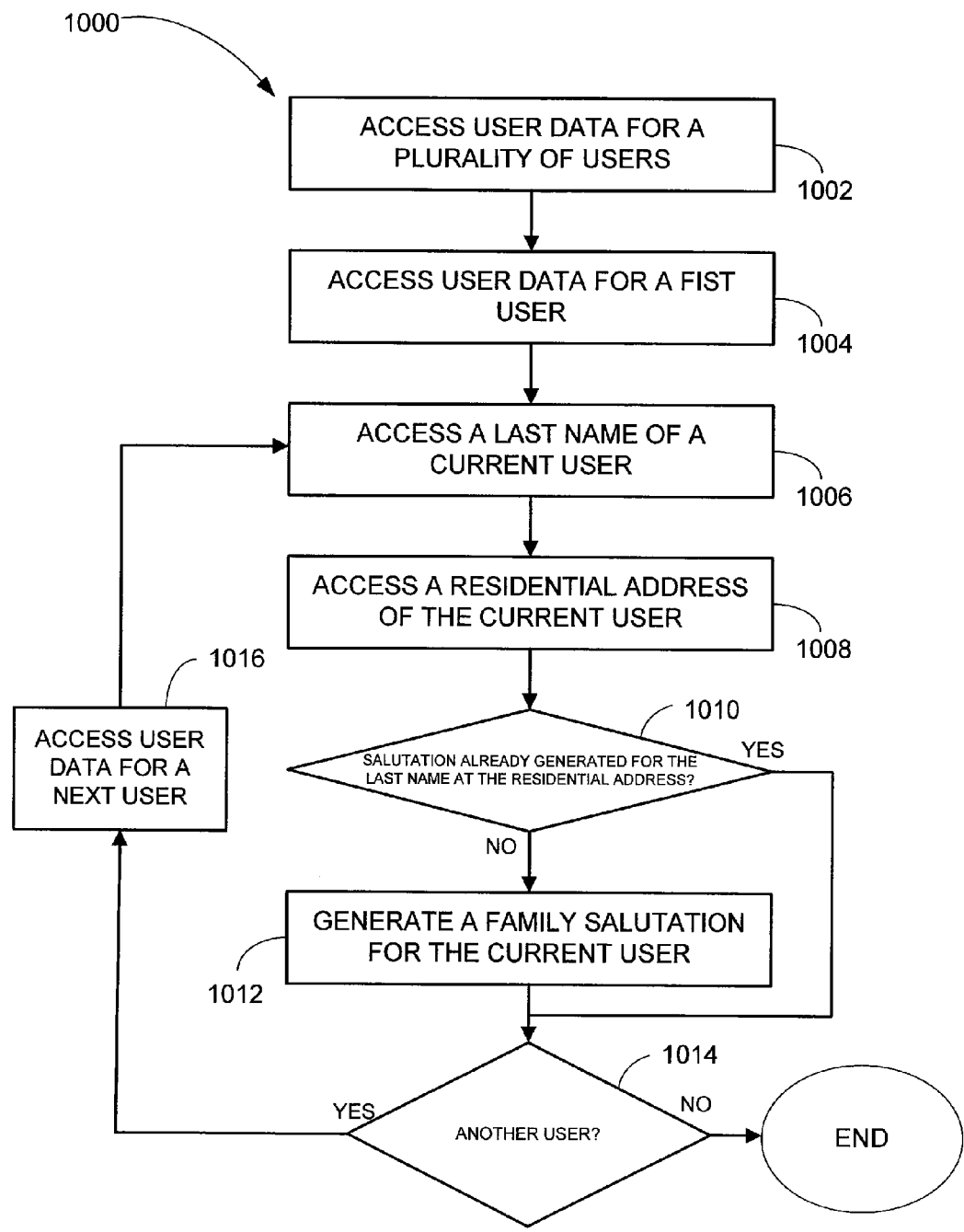
FIG. 10 is a flowchart illustrating a method in accordance with an example embodiment for processing a family salutation request.

Referring to FIG. 10, a method 1000 for processing a family salutation request in accordance with an example embodiment is illustrated. In an example embodiment, the operations of the method 1000 may be performed at block 808 (see FIG. 8).

The user data 110 (see FIG. 1) may be accessed for a plurality of users for whom generation of salutations are desired at block 1002. For example, the plurality of users may be identified in a user information file. In an example embodiment, the user data 110 may be stored in the user database 106 (see FIG. 1). In an example embodiment, the user data 110 may be stored in the address data source 108 (see FIG. 1). In an example embodiment, the user data 101 may be stored in the user information file.

A first user from the plurality of users may be accessed at block 1004. The method 1000 at block 1006 may access a last name of a current user from the last name field 308 of the name and designation data structure 300 corresponding to the current user (see FIG. 3). A residential address of the current user may be accessed at block 1006 from a residential address field 314 (see FIG. 3) of the name and designation data structure 300.

At decision block 1010, the method 1000 may determine whether a family salutation has already been generated for the last name at the residential address. If the family salutation has not been generated, the family salutation may be generated for the current user at block 1012. For example, the family salutation may be "To The Family Of [Last Name]", "To The [Last Name] Family", and the like. In an example embodiment, the family salutation may be retained in the output data structure 700 (see FIG. 7).

At decision block 1014, the method 1000 may determine whether there is another user among the plurality of users. If there is another user, the user data 110 for another user may be accessed at block 1016 and the method 1000 may return to block 1006. If there is not another user at decision block 1014, the method 1000 may terminate.

Figure 11:
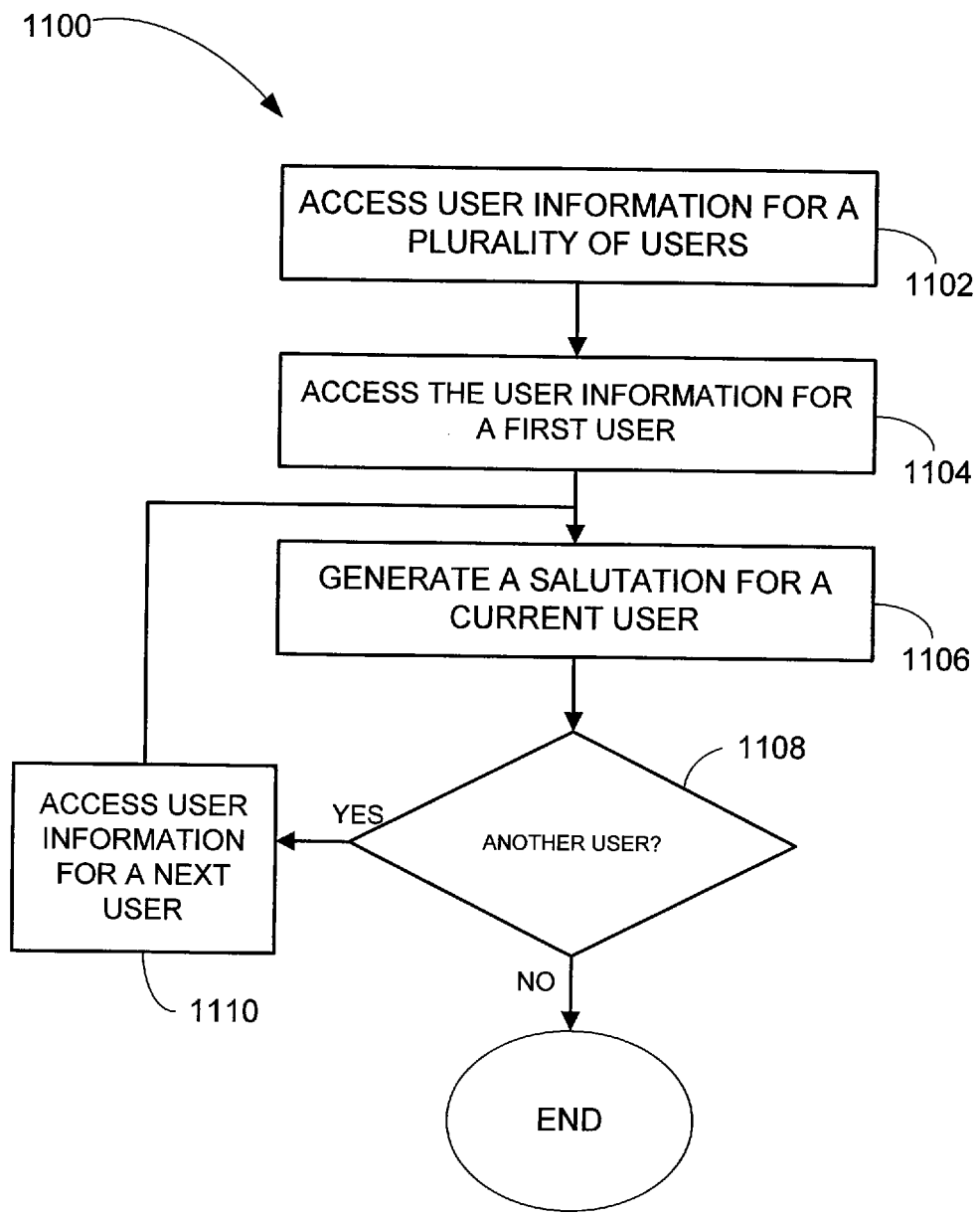
FIG. 11 is a flowchart illustrating a method in accordance with an example embodiment for processing a non-family salutation request.

Referring to FIG. 11, a method 1100 for processing a non-family salutation request in accordance with an example embodiment is illustrated. In an example embodiment, the operations of the method 1100 may be performed at block 810 (see FIG. 8).

The user data 110 may be accessed for a plurality of users at block 1102. For example, the plurality of users may be identified in a user information file. In an example embodiment, the user data 110 may be stored in the user database 106 (see FIG. 1). In an example embodiment, the user data 110 may be stored in the address data source 108 (see FIG. 1). In an example embodiment, the user data 101 may be stored in the user information file.

At block 1104, the user information may be accessed for a first user among the plurality of users.

A salutation may be generated for a current user at block 1106. An example embodiment of generating a salutation for the current user is described in greater detail below.

At decision block 1108, the method 1100 may determine whether there is another user among the plurality of users for whom a salutation should be generated. If there is another user, the user information may be accessed for another user and the method 1100 may return to block 1106. If there is not another user among the plurality of users at decision block 1108, the method 1100 may terminate.

Figure 12:
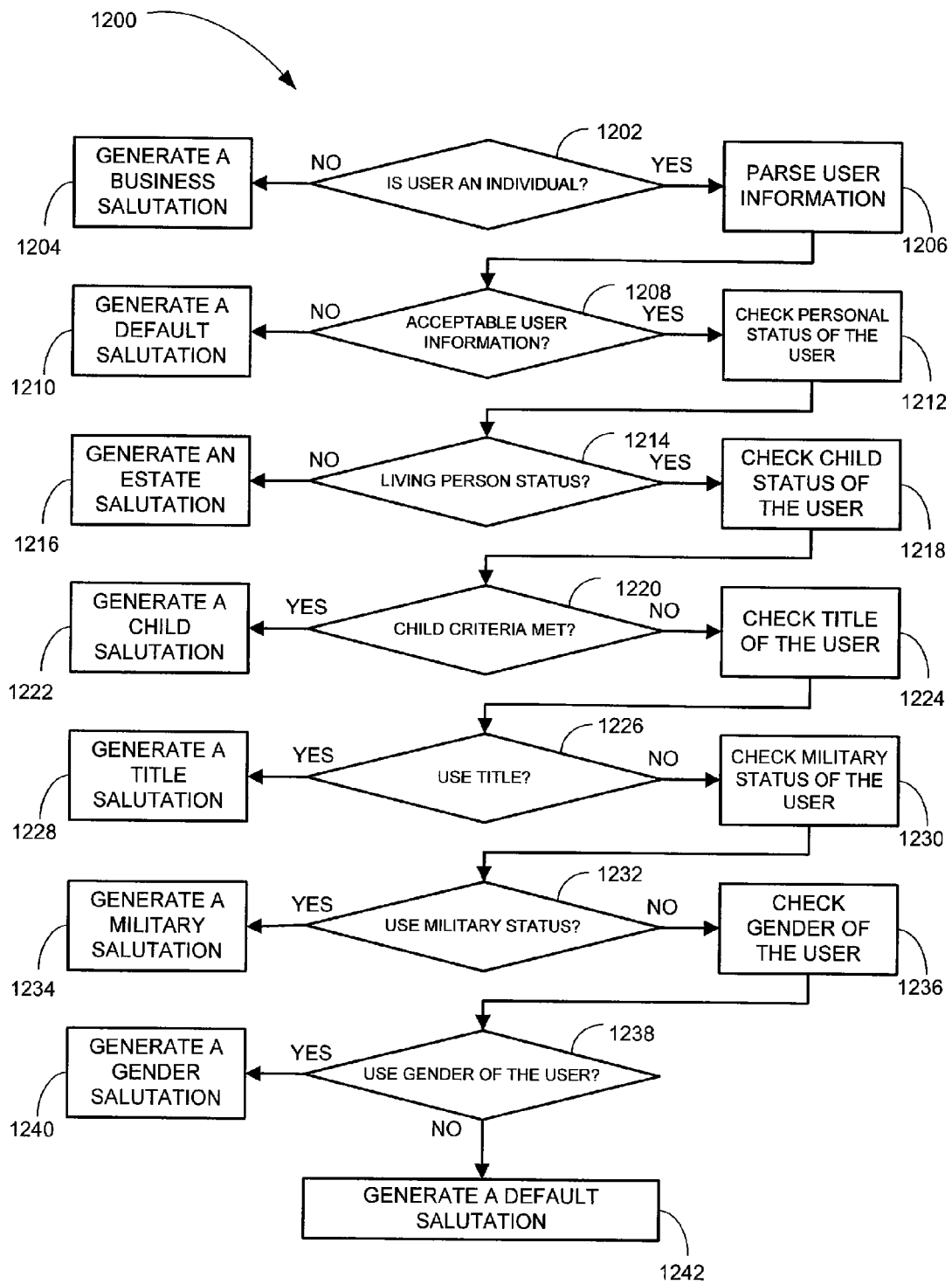
FIG. 12 is a flowchart illustrating a method in accordance with an example embodiment for generating a salutation for a user.

Referring to FIG. 12, a method 1200 for generating a salutation for a user in accordance with an example embodiment is illustrated. In an example embodiment, the operations of method 800 may be performed by the salutation application 102 (see FIG. 1). In an example embodiment, the method 1200 may be performed at block 908 (see FIG. 9). In an example embodiment, the method 1200 may be performed at block 1106.

At decision block 1202, a determination may be made as to whether the user is an individual. In an example, the determination may be made by determining whether the user has the name field 302 of the name and designation data structure 300 or business name field 402 of the name and designation data structure 400 (see FIGS. 3 and 4). If the user is not an individual, a business salutation may be generated for the user at block 1204. For example, the generated business salutation may be the business name of the business name field 402.

If the user is an individual at decision block 1202, the method 1200 may parse the user information at block 1206. In an example embodiment, parsing the user information may include alerting capitalization (e.g., converting the information into upper and/or lower case) of various fields that may be used in generating the salutation. In an example embodiment, the user information may be in the form of user data structure 200, the name and designation data structure 300, the military service data structure 500, and/or the association data structure 600.

The method 1200 may determine whether user information of the user is in an acceptable format at decision block 1208. For example, when the fields of the user data structure 200, the name and designation data structure 300, the military service data structure 500, and/or the association data structure 600 are completed with valid values, the user information for a user may be in the acceptable format. In an example embodiment, if a last name is not provided the user information may not be in an acceptable format.

If the user information is not in the acceptable format (e.g., is in an unacceptable format), the method 1200 may generate a default salutation for the user at block 1210. For example, the default salutation may include "Dear Account Holder", "Dear Customer", "Dear Future Officer", "Dear Inactive Member", "Dear Member", "Dear Prospective Customer", "Dear Policyholder", "Dear Shareholder", and the like.

If the user information is in the acceptable format at decision block 1208, the method 1200 may check a personal status of the user at block 1212. For example, checking the personal status of the user may be checking the personal status field 316 of the name and designation data structure 300 to determine whether the user is living. An example embodiment of checking the personal status of the user is described in greater detail below.

At decision block 1214, the method 1200 may determine whether the user has the personal status of living (e.g., the user is alive). If the user is not alive, the method 1200 may generate an estate salutation for the user at block 1216. For example, the estate salutation may include "To The Estate of [Name]" and "To The Trustee of the Estate of [Name]".

If the user is determined to be alive at decision block 1214, the method 1200 may check a child status of the user at block 1218 to determine whether child criteria is met. An example embodiment for checking the child status of the user is described in greater detail below. If child criteria is met, a child salutation may be generated at block 1222. For example, the child salutation may include "To The Parents of [Name]" and "Dear [Parent Last Name]:"

If the child criteria is not met, a title of the user may be checked at block 1224. An example embodiment of checking the title is described in greater detail below.

The method 1200 may determine at decision block 1226 whether the title (if any) of the user may be used. If the title (e.g., a professional designation) is to be used, a title salutation may be generated at block 1228. For example, the title salutation may include "Dear Dr. [Last Name]", "Dear Governor [Last Name]", "Dear Reverend [Last Name]", "Dear Rabbi [Last Name]", "Dear Bishop [Last Name]", "Dear Chaplain [Last Name]", "Dear Father [Last Name]", "Dear Honorable [Last Name]", "Dear Monsignor [Last Name]", "Dear Professor [Last Name]", and the like. If the title is not be used at decision block 1226, the method 1200 may check a military status of the user at block 1230. An example embodiment of a method for checking the military status of the user is described in greater detail below.

At decision block 1232, the method 1200 determines whether to use the military status. If the military status is to be used, the method 1200 may generate a military salutation at block 1234. For example, the military salutation may include "Dear [Military Rank] [Last Name]". If the military status is not to be used at decision block 1232, the gender field 318 (see FIG. 3) of the user may be checked at block 1236 to determine whether the gender field is valid and/or should be used.

If the gender of the user is valid and should be used, the method 1040 may generate a gender salutation (e.g., "Dear Mr. Smith") for the user at block 1240. An example embodiment for generating the gender salutation is described in greater detail below. If the gender of the user is not valid and/or should not be used, the default salutation may be generated for the user at block 1242.

After the completion of the operations at block 1204, block 1210, block 1216, block 1222, block 1228, block 1234, block 1240, or block 1242, the method 1200 may terminate.

In an example embodiment, the salutations generated at the block 1204, block 1210, block 1216, block 1222, block 1228, block 1234, block 1240, and/or block 1242 may each be stored within the salutation field 704 of the output data structure 700, along with an identifier in the identifier field 702, and a return code in the return code field 706 (see FIG. 7). An indication may be contained in the default salutation indicator field 708 of the output data structure 700 if the default salutation was generated at block 1210 or block 1242.

Figure 13:
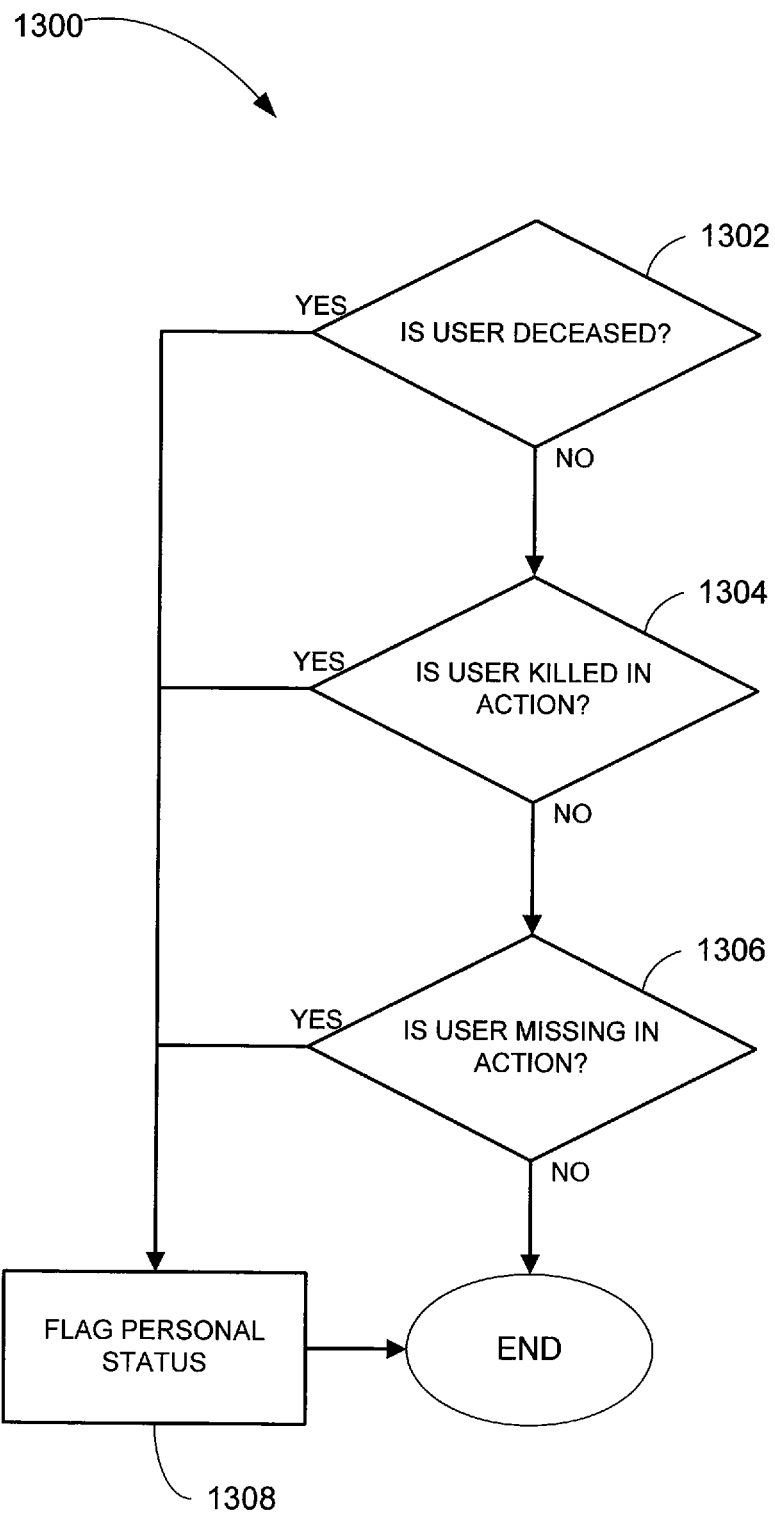
FIG. 13 is a flowchart illustrating a method in accordance with an example embodiment for checking a personal status of a user.

Referring to FIG. 13, a method 1300 for checking a personal status of a user in accordance with an example embodiment is illustrated. In an example embodiment, the method 1300 may be performed at the block 1212 (see FIG. 12).

The method 1300 may determine at decision block 1302 whether the user is deceased. For example, a determination as to whether the user is deceased may be made by accessing data of the personal status field 316 and/or the military activity status field 508 (see FIGS. 3 and 5). If the user is deceased, the method may proceed to block 1308. If the user is not deceased at decision block 1302, the method 1300 may proceed to decision block 1304.

At decision block 1304, a determination may be made as to whether the user was killed in action. For example, the determination may be made by checking the military activity status field 508 (see FIG. 5) to verify that the user does not have a status of killed-in-action. If the user has been killed-in-action, the method 1300 may proceed to block 1308. If the user has not been killed-in-action, the method 1300 may proceed to decision block 1306.

The method 1300 may determine at decision block 1306 whether the user is missing in action. For example, the determination may be made by checking the military activity status 508 to verify that the user does not have a status of missing-in-action. If the user is missing in action, the method 1300 at block 1308 may flag the personal status of the user, such that an estate salutation will be generated for the user at block 1216 (see FIG. 12). If the user is not missing in action or after completing the operations at block 1308, the method 1300 may terminate.

Figure 14:
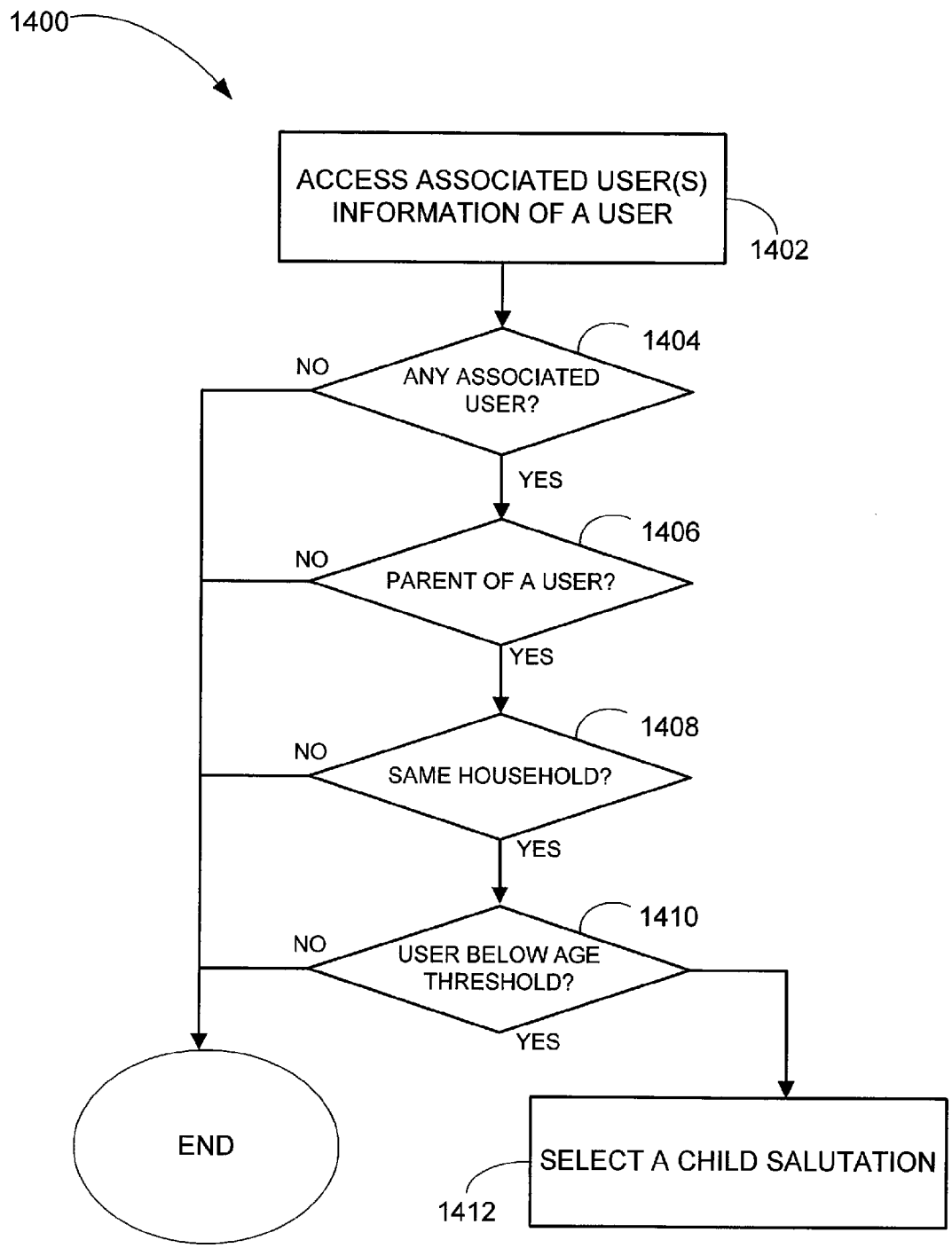
FIG. 14 is a flowchart illustrating a method in accordance with an example embodiment for checking child status of a user.

Referring to FIG. 14, a method 1400 for checking child status of a user in accordance with an example embodiment is illustrated. In an example embodiment, the method 1400 may be performed at the block 1218 (see FIG. 12).

The method 1400 may access user information for any associated users of the user at block 1402. For example, the user information may be accessed for any associated users listed in the associated user fields 604.1-604.*n* of the association data structure 600 that have a same user identification field 602 as the user (see FIG. 6).

At decision block 1404, the method 1400 may determine whether there are any associated users (e.g., whether the associated user fields identify any associated users). If the are no associated users, the method 1400 may terminate. If there are associated users, the method 1400 may proceed to decision block 1406.

The method 1400 may determine whether the user has one or more parents identified amount the associated users at decision block 1406. If the user does not have any identified parents, the method 1400 may terminate. If the user has at least one identified parent, the method 1400 may proceed to decision block 1408.

At decision block 1408, the method 1400 may determine whether any of the identified parents are in the same household as the user. For example, the method 1400 may determine whether the residential address of the user and any of the identified parents are the same residential address. If the identified parents are not in the same household, the method 1400 may terminate. If at least one of the identified parents is in the same household, the method 1400 may proceed to decision block 1410.

The method 1400 at decision block 1410 may determine whether an age of the user is below an age threshold. For example, the age threshold may be an arbitrary number (e.g., sixteen years old or eighteen years old) or based an external factor (e.g., age of independence). If the user is above the age threshold, the method 1400 may terminate. If the user is below the age threshold, generation of a child salutation may be selected at block 1412. For example, the child salutation may be generated at block 1222 (see FIG. 12). After completing the operations of block 1412, the method 1400 may terminate.

Figure 15:
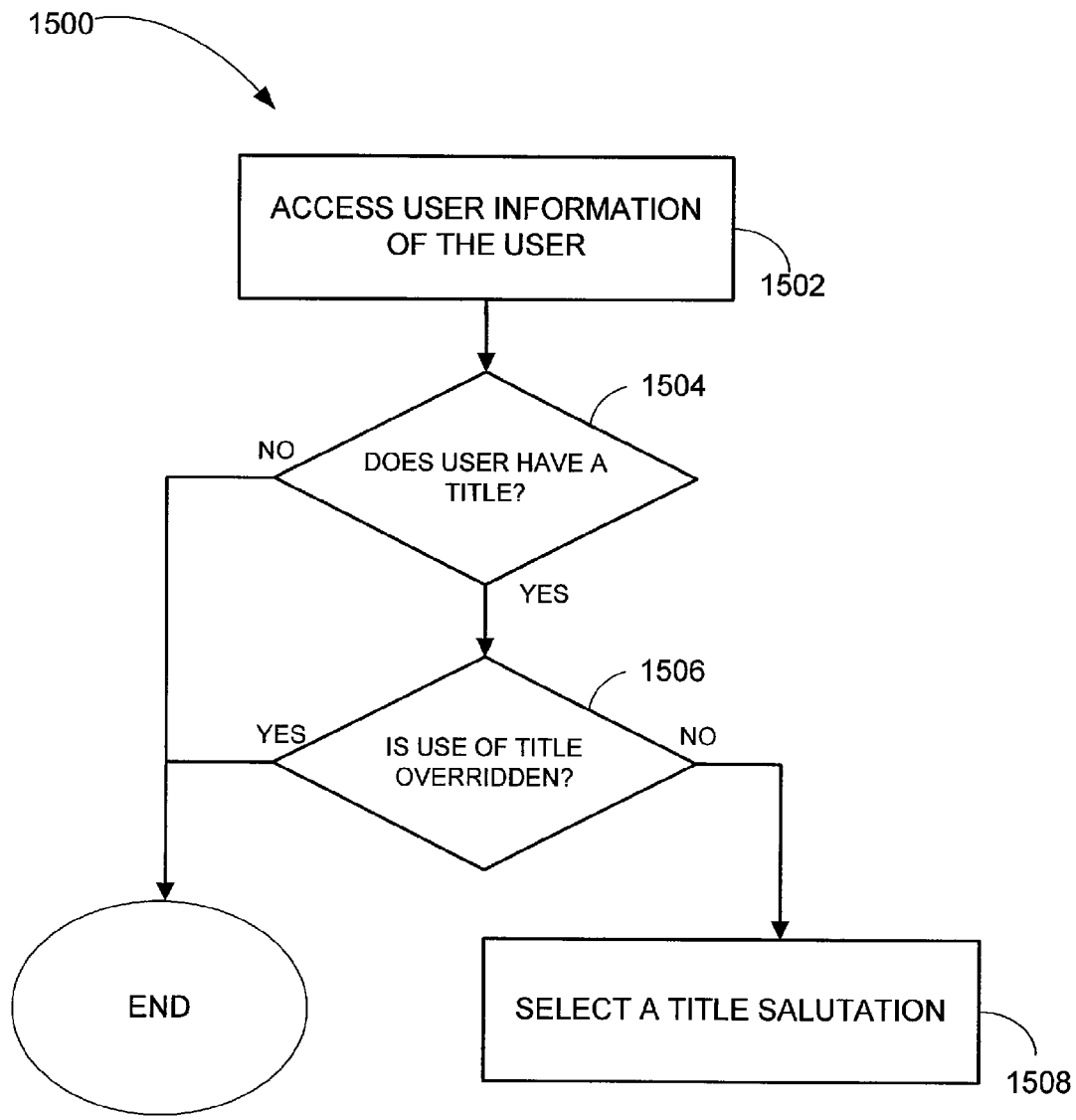
FIG. 15 is a flowchart illustrating a method in accordance with an example embodiment for generating a title salutation.

Referring to FIG. 15, a method 1500 for generating a title salutation in accordance with an example embodiment is illustrated. In an example embodiment, the method 1500 may be performed at the block 1224 (see FIG. 12).

User information of the user may be accessed at block 1502.

At decision block 1514, the method 1500 may determine whether the user has a title. For example, the method 1500 may check the titles field 310 (see FIG. 3) to determine whether the user has the title. If the user does not have the title, the method 1500 may terminate. If the user has the title, the method 1500 may proceed to decision block 1506.

A determination may be made at decision block 1506 as to whether use of the title should be overridden. For example, the method 1500 may check the override field 322 (see FIG.

3) to determine if the use of the title should be overridden. If the use of the title should be overridden, the method 1500 may terminate.

If the use of the title should not be overridden, the method 1500 may select a title salutation for generation of the salutation at block 1508. For example, the title salutation may be generated at block 1228 (see FIG. 12). After completing the operations of block 1508, the method 1500 may terminate.

Figure 16:
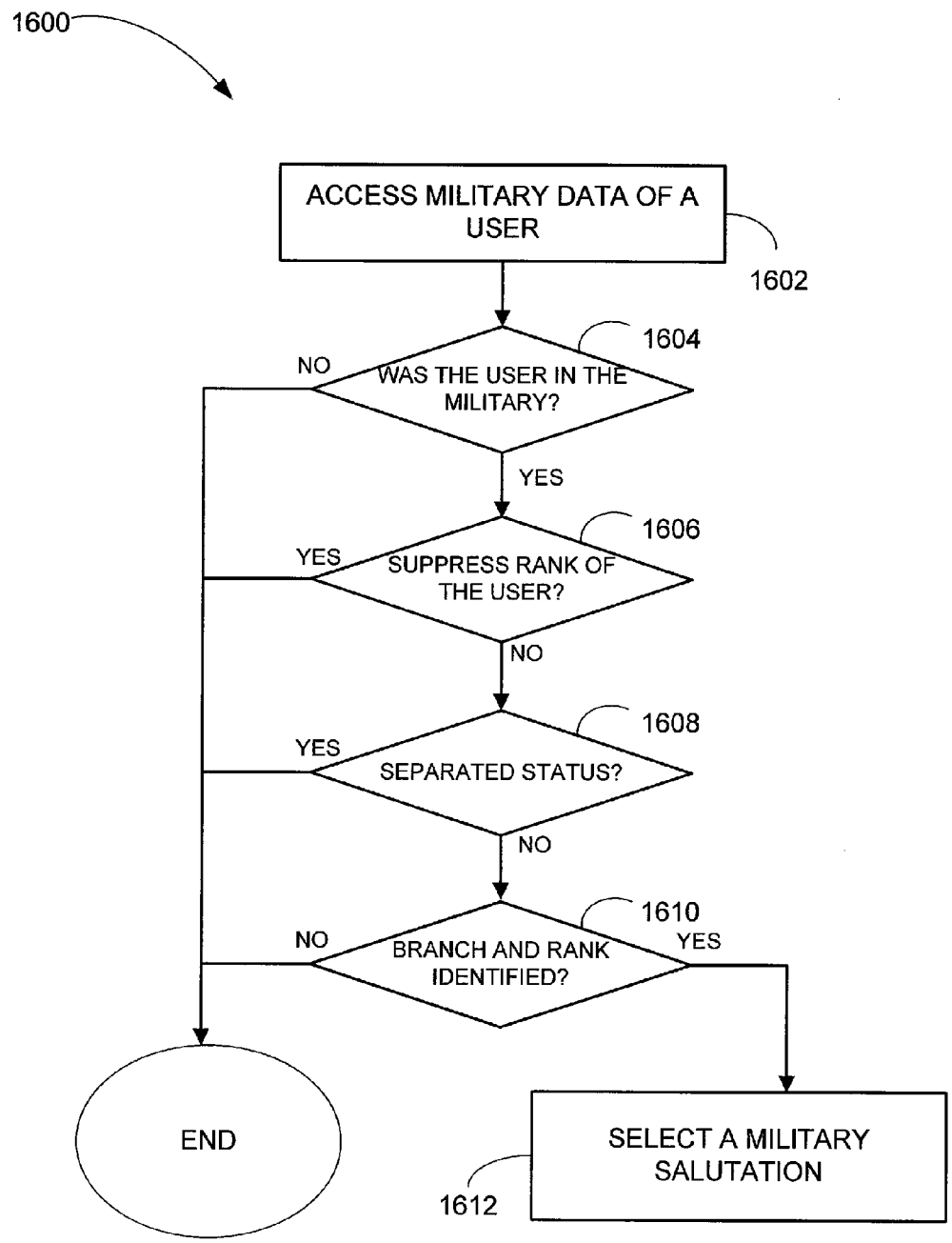
FIG. 16 is a flowchart illustrating a method in accordance with an example embodiment for checking military status of a user.

Referring to FIG. 16, a method 1600 for checking military status of a user in accordance with an example embodiment is illustrated. In an example embodiment, the method 1600 may be performed at the block 1230 (see FIG. 12).

The method 1600 may attempt to access the military data 112 (see FIG. 1) for the user, such as may be received in the form of the military service data structure 500 (see FIG. 5).

The method 1600 may determine whether the user was (or currently still is) in the military. If the user was not in the military, the method 1600 may terminate. If the user was in the military, the method 1600 may proceed to decision block 1606.

At decision block 1606, the method 1600 may determine whether to suppress rank of the user. In an example embodiment, the suppression of the rank may be identified in the override field 322 (see FIG. 3). In an example embodiment, the rank may not be suppressed if the military activity status field 508 indicates that the user is active, retired, precommissioned, and/or active reserved and the rank may be suppressed if the military activity status field 508 indicates that the user is retired, inactive reserve, none, and/or separated. If the rank of the user is to be suppressed, the method 1600 may terminate. If the rank of the user is not to be suppressed, the method 1600 may proceed to decision block 1608.

The method 1600 may determine at the decision block 1608 whether the user has a separated status. For example, the method 1600 may check the military activity status 508 of the military service data structure 500 (see FIG. 5) to determine whether the user has a separated status. If the user has a separated status, the method 1600 may terminate. If the user does not have a separated status, the method 1600 may proceed to decision block 1610.

At decision block 1610, the method 1600 may determine whether a branch of service and a military rank has been identified for the user. For example, the branch of service may be identified from the branch of service field 504 and the military rank may be identified from the military rank field 506 of the military service data structure 500 (see FIG. 5). If the branch of service and military rank have not been identified, the method 1600 may terminate. If the branch of service and military rank have not been identified, a military salutation may be selected for generation at block 1612. For example, the military salutation may be generate at block 1234 (see FIG. 12). After completing the operations at block 1612, the method 1600 may terminate.

In an example embodiment, if the branch of service field 504 does not contain an appropriate branch of service, an error code may be returned.

Figure 17:
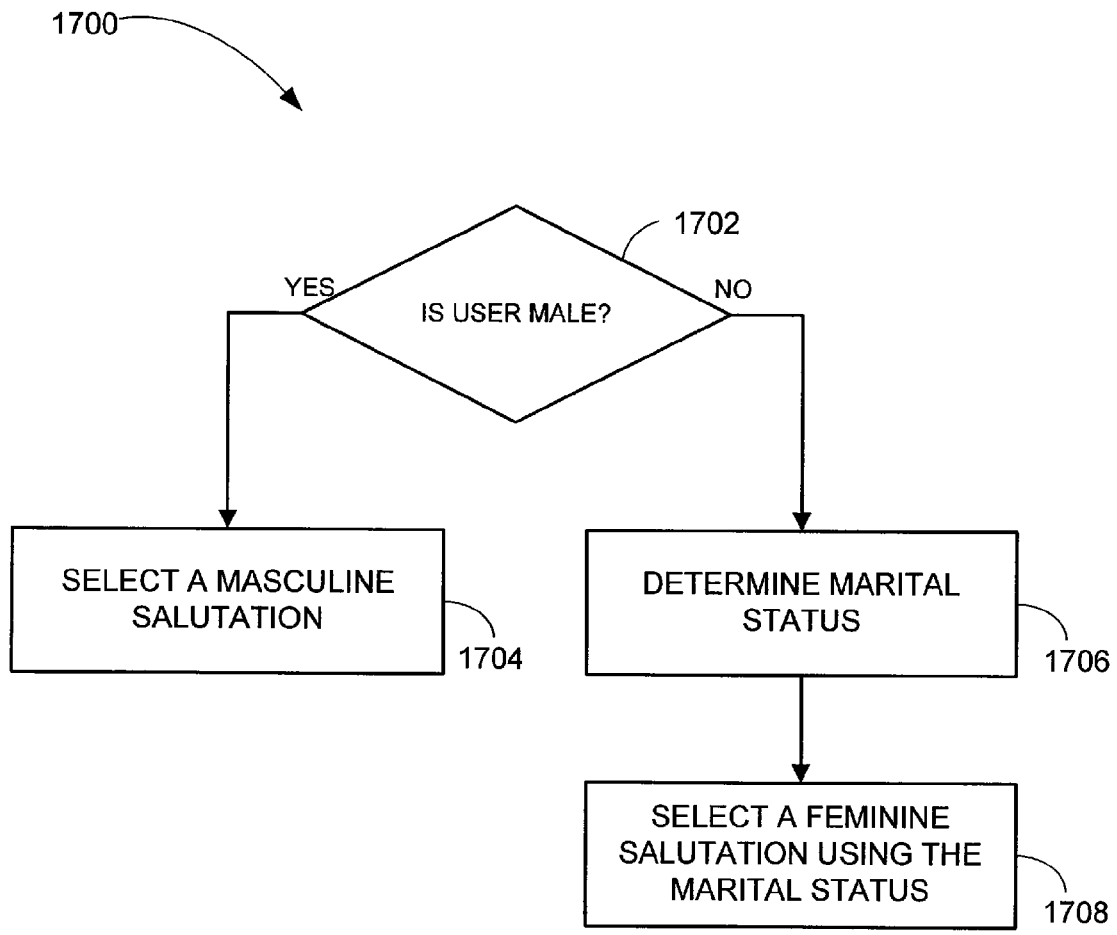
FIG. 17 is a flowchart illustrating a method in accordance with an example embodiment for generating a gender salutation.

Referring to FIG. 17, a method 1700 for generating a gender salutation in accordance with an example embodiment is illustrated. In an example embodiment, the method 1700 may be performed at the block 1240 (see FIG. 12).

At decision block 1702, the method 1700 may determine whether a user is a male user. For example, the method 1700 may check the gender field 318 of the name and designation data structure 300 to determine whether the user is a male user (see FIG. 3). If the user is a male user, the method 1700 may select a male salutation for generation. For example, the male salutation may include "Dear Mr. [Last Name]".

In an example embodiment, if the gender field 318 is blank or does not contain the values of male or female, an error code may be returned and/or a default salutation may be selection for generation for the user.

If the user is determined not to be a male user at decision block 1702, the method 1700 may determine a marital status of the user at block 1706. In an example embodiment, the marital status of the user may be checked by accessing marital information in the marital status field 324 (see FIG. 3). In an example embodiment, the marital status of the user may be checked by accessing the associated user fields 604.1-604.$n$ (see FIG. 6).

The method may select a feminine salutation using the martial status at block 1708. For example, the feminine salutation may be "Dear Mrs. [Last Name] when the martial status is married and the feminine salutation may be "Dear Ms. [Last Name] when the martial status is not married. After completion of the operations at block 1704 or block 1708, the method 1700 may terminate.

In an example embodiment, if the marital status field 324 does not contain valid data, an error code may be returned and the feminine salutation for when the martial status is not married may be used.

Figure 18:
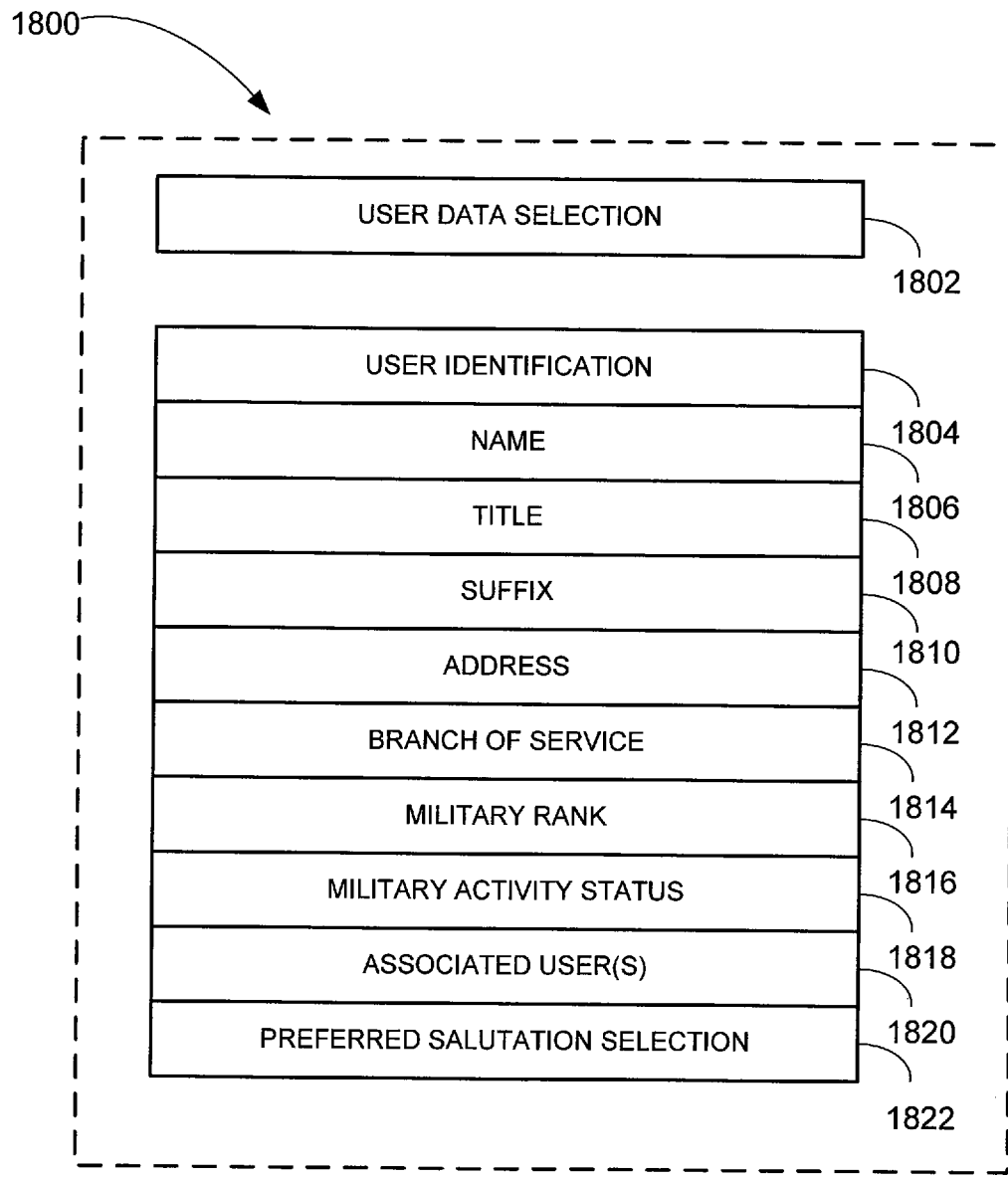
FIG. 18 is a block diagram of a user interface in accordance with an example embodiment.

Referring to FIG. 18, a user interface 1800 in accordance with an example embodiment is illustrated. In an example embodiment, the user interface 104 (see FIG. 1) may include the user interface 1800.

The user interface 1800 may include a user data selection 1802, which may optionally enable an operator to select the user data 110 to be used for generating salutations.

A user identification field 1804 may be completed with a user identification, such as may be stored in the user identification field 202, 502, 602 (see FIGS. 2, 5 and 6). A name field 1806 may be completed with a user name, such as may be stored in the name field 302 or the business name field 402 (see FIGS. 3 and 4). A title field 1808 may be completed with a title, such as may be stored in the title field 310 (see FIG. 3).

A suffix field 1810 may be completed with a suffix, such as may be stored in the suffix field 312 (see FIG. 3). An address field 1812 may be completed with an address, such as may be stored in the residential address field 314 or the business address field 404 (see FIGS. 3 and 4).

A branch of service field 1814 may be completed with a branch of service, such as may be stored in the branch of service field 504 (see FIG. 5). A military rank field 1816 may be completed with a military rank, such as may be stored in the military rank field 506 (see FIG. 5). A military activity status field 1818 may be completed with a military activity status, such as may be stored in the military activity status field 508 (see FIG. 5).

An associated users field 1820 may be completed with one or more associated users, such as may be stored in the associated user fields 604.1-604.$n$ (see FIG. 6).

A preferred salutation selection field 1822 may be completed with an identification of a preferred salutation. In an example embodiment, the preferred salutation may include override information such as may be stored in the override field 322. In an example embodiment, the preferred salutation may identify a default salutation to be used.

Figure 19:
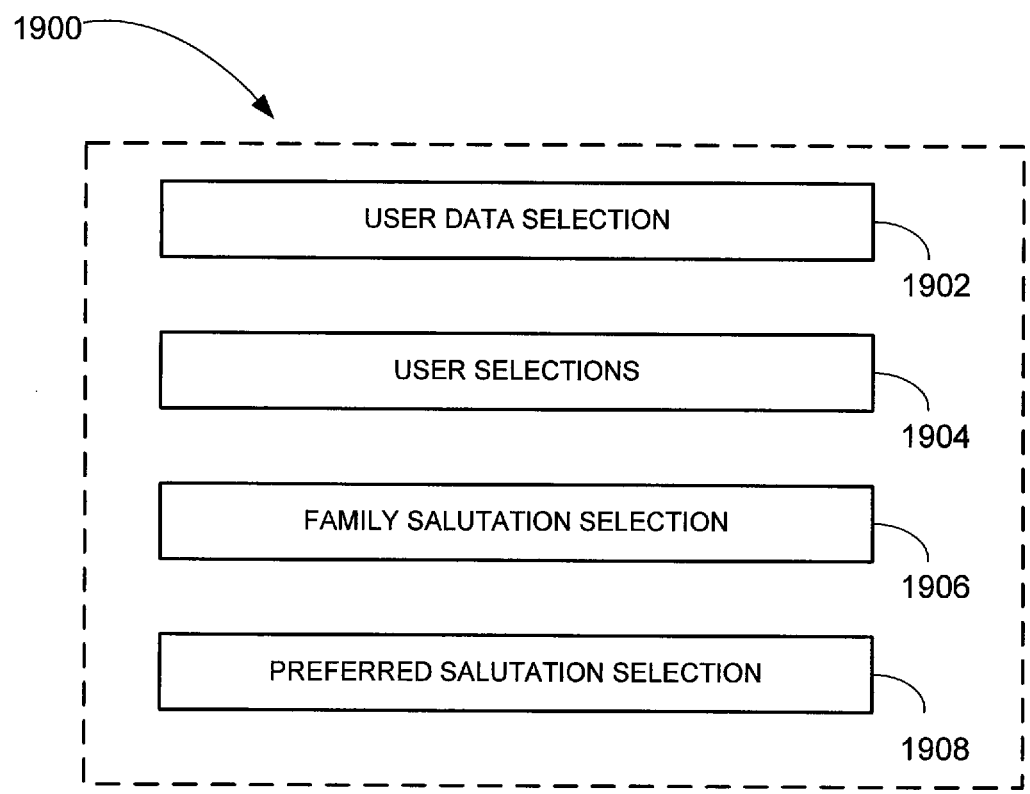
FIG. 19 is a block diagram of a user interface in accordance with an example embodiment.

Referring to FIG. 19, a user interface 1900 in accordance with an example embodiment is illustrated. In an example embodiment, the user interface 104 (see FIG. 1) may include the user interface 1900.

The user interface 1900 may include a user data selection 1902, which may enable an operator to select the user data 110 (see FIG. 1) to be used for generating salutations. A users selection field 1904 may enable the operator to select a plurality of users from among the user data 110 for whom salutations will be generated.

A family salutation selection 1906 may enable the operator to select processing of a family salutation such as may be processed at block 808 as opposed to processing of a non-family salutation such as may be processed at block 810 (see FIG. 8).

A preferred salutation selection field 1908 may be completed with an identification of a preferred salutation. For example, the preferred salutation may identify a default salutation to be used.

Figure 20:
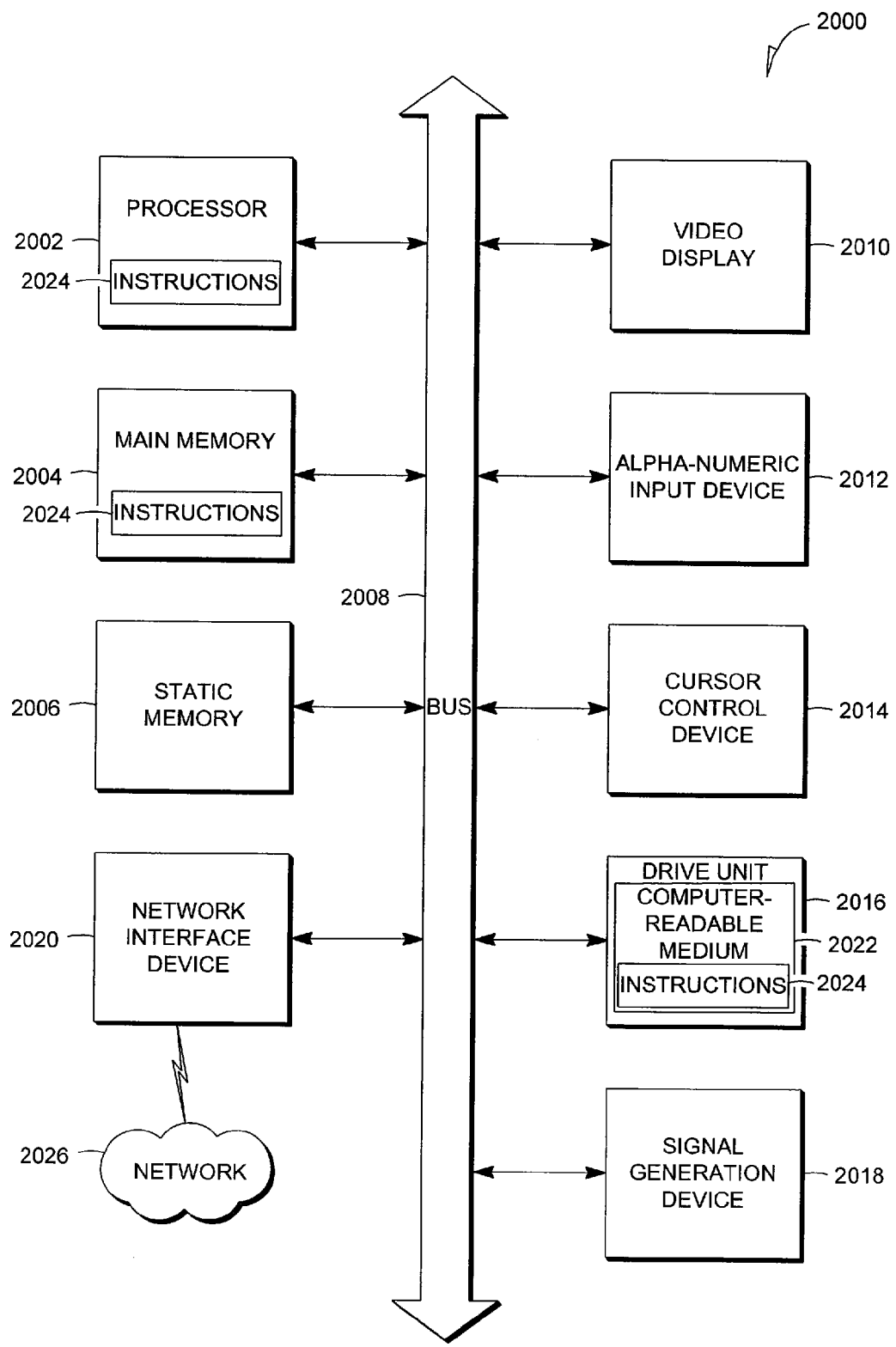
FIG. 20 illustrates a diagrammatic representation of machine in the example form of a computer system within which a set of instructions, for causing the machine to perform any one or more of the methodologies discussed herein, may be executed.

FIG. 20 shows a diagrammatic representation of machine in the form of a computer system 2000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a car audio device, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU) a graphics processing unit (GPU) or both), a main memory 2004 and a static memory 2006, which communicate with each other via a bus 2008. The processor 2002 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 2002 may execute instructions and includes that portion of the computer system 2000 that controls the operation of the entire computer system 2000.

The computer system 2000 may further include a video display unit 2010 (e.g., a liquid crystal display (LCD) or a cathode ray tube (CRT)). The computer system 2000 also includes an alphanumeric input device 2012 (e.g., a keyboard), a cursor control device 2014 (e.g., a mouse), a disk drive unit 2016, a signal generation device 2018 (e.g., a speaker) and a network interface device 2020.

The cursor control device 2014 may be a keyboard, mouse or other pointing device, trackball, touchpad, touch screen, keypad, microphone, voice recognition device, or any other appropriate mechanism for the user to input data to the computer 2000 and manipulate the user interface previously discussed. Although only one input device 2014 is shown, in another embodiment any number and type of input devices may be present.

The disk drive unit 2016 includes a machine-readable medium 2022 on which is stored one or more sets of instructions (e.g., software 2024) embodying any one or more of the methodologies or functions described herein. The software 2024 may also reside, completely or at least partially, within the main memory 2004 and/or within the processor 2002 during execution thereof by the computer system 2000, the main memory 2004 and the processor 2002 also constituting machine-readable media.

The software 2024 may further be transmitted or received over a network 2026 via the network interface device 2030. The network 2026 may be any suitable network and may support any appropriate protocol suitable for communication to the computer system 2000. In an embodiment, the network 2026 may support wireless communications. In another embodiment, the network 2026 may support hard-wired communications, such as a telephone line or cable. In another embodiment, the network 2026 may support the Ethernet IEEE (Institute of Electrical and Electronics Engineers) 802.3x specification. In another embodiment, the network 2026 may be the Internet and may support IP (Internet Protocol). In another embodiment, the network 2026 may be a local area network (LAN) or a wide area network (WAN). In another embodiment, the network 2026 may be a hotspot service provider network. In another embodiment, the network 2026 may be an intranet. In another embodiment, the network 2026 may be a GPRS (General Packet Radio Service) network. In another embodiment, the network 2026 may be any appropriate cellular data network or cell-based radio network technology. In another embodiment, the network 2026 may be an IEEE 802.11 wireless network. In still another embodiment, the network 2026 may be any suitable network or combination of networks. Although one network 2026 is shown, in other embodiments any number of networks (of the same or different types) may be present.

While the machine-readable medium 2022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The computer system 2000 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer system 2000. For example, other peripheral devices such as audio adapters or chip programming devices, such as EPROM (Erasable Programmable Read-Only Memory) programming devices may be used in addition to, or in place of, the hardware already depicted.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for deriving salutations comprising:
   a processor operable to execute instructions;
   a memory holding data including user data for a plurality of users, military data, and association data;
   a salutation application, executed on the processor, to:
      determine whether an association is identified between at least two users of the plurality of users based on the association data;
      when the association has been identified, determine whether the at least two users are a member of a same family based on the user data;
      determine a military activity status of at least one user of the at least two users of the plurality of users based on the military data;
      determine if the user data is an acceptable format, wherein the acceptable format comprises the user data including at least a last name of the at least two users;
      derive a family salutation to a family of the at least two users responsive to a determination of the user data being in the acceptable format;
      derive a default salutation to at least one user of the at least two users responsive to a determination of the user data not being in the acceptable format;
      transmit one of the derived family salutation and the derived default salutation in response to a salutation request for the at least two users; and
   a use application, distinct from the salutation application, to:
      transmit the salutation request to the salutation application;
      receive one of the derived family salutation and the derived default salutation.

2. The system of claim 1, wherein the family salutation is at least one of "To The Family Of [Last Name]" or "To The [Last Name] Family".

3. The system of claim 1, wherein the user data comprises:
   a user identification field to identify the plurality of users within a database; and
   a name and designation field to provide personal information regarding the plurality of users.

4. The system of claim 1, wherein the user data is stored within a user database.

5. The system of claim 1, wherein the salutation application derives a non-family salutation for an additional user of the plurality of users from the user data that is not a member of the same family or another family with another user of the at least some of the plurality of users and transmits the derived non-family salutation in response to the salutation request, and the use application receives the derived non-family salutation.

6. The system of claim 1, wherein identification of the at least two users that are the member of the same family based on the user data includes identification of the at least two users that have a same last name and a same residential address based on the user data.

7. An apparatus comprising:
   a processor operable to execute instructions;
   a memory holding data including user data for a plurality of users, military data, and association data;
   a salutation application to determine whether an association is identified between at least two users of the plurality of users based on the association data, determine whether the at least two users are a member of a same family based on the user data, determine a military activity status of at least one user of the at least two users of the plurality of users based on the military data, determine if the user data is an acceptable format, wherein the acceptable format comprises the user data including at least a last name of the at least two users, derive a family salutation to a family of the at least two users responsive to a determination of the user data being in the acceptable format, derive a default salutation to at least one user of the at least two users responsive to a determination of the user data not being in the acceptable format, and transmit one of the derived family salutation and the derived default salutation in response to a salutation request for the at least two users; and
   a use application, distinct from the salutation application, to transmit the salutation request to the salutation application, receive one of the derived family salutation and the derived default salutation.

8. The apparatus of claim 7, wherein the derived family salutation is a phrase of a greeting that comes before a body of a letter to the at least two users.

9. The apparatus of claim 7, wherein:
   the family salutation is at least one of "To The Family Of [Last Name]" or "To The [Last Name] Family".

10. The apparatus of claim 7, wherein the user data comprises:
    a user identification field to identify the plurality of users within a database; and
    a name and designation field to provide personal information regarding the plurality of users.

11. The apparatus of claim 7, wherein the user data is stored within a user database.

12. The apparatus of claim 7, wherein the application derives a non-family salutation for an additional user of the plurality of users from the user data that is not a member of the same family or another family with another user of the at least some of the plurality of users and transmits the derived non-family salutation in response to the salutation request, and the use application receives the derived non-family salutation.

13. The apparatus of claim 7, wherein identification of the at least two users that are the member of the same family based on the user data includes identification of the at least two users that have a same last name and a same residential address based on the user data.

14. A method comprising:
    using one or more processors to perform at least a portion of one or more of the following operations:
    accessing user data for a plurality of users, military data, and association data;

receiving a salutation request for at least some of the plurality of users;

determining, by a salutation application, whether an association is identified between at least two users of the plurality of users based on the association data;

when the association has been identified, determine, by the salutation application, whether the at least two users are a member of a same family based on the user data;

determining, by the salutation application, a military activity status of at least one user of the at least two users of the plurality of users based on the military data;

determining, by the salutation application, if the user data is an acceptable format, wherein the acceptable format comprises the user data including at least a last name of the at least two users;

deriving, by the salutation application, a family salutation to a family of the at least two users responsive to a determination of the user data being in the acceptable format;

deriving, by the salutation application, a default salutation to at least one user of the at least two users responsive to a determination of the user data not being in the acceptable format;

transmitting, to a use application, distinct from the salutation application, one of the derived family salutation and the derived default salutation in response to the receiving of the salutation request.

15. The method of claim 14, wherein the derived family salutation is a phrase of a greeting that comes before a body of a letter to the at least two users.

16. The method of claim 14, further comprising:
selecting at least one of "To The Family Of [Last Name]" or "To The [Last Name] Family" as the family salutation.

17. The method of claim 14, wherein the user data comprises:
a user identification field to identify the plurality of users within a database; and
a name and designation field to provide personal information regarding the plurality of users.

18. The method of claim 14, further comprising storing the user data within a user database.

19. The method of claim 14, further comprising:
deriving a non-family salutation for an additional user of the plurality of users from the user data that is not a member of the same family or another family with another user of the at least some of the plurality of users; and
transmitting the derived non-family salutation in response to the receiving of the salutation request.

20. The system of claim 1, wherein the default salutation is at least one of "Dear Shareholder" and "Dear Account Holder."

* * * * *